United States Patent [19]

Rabatin

[11] Patent Number: 4,478,933

[45] Date of Patent: Oct. 23, 1984

[54] MULTI-LAYER X-RAY SCREENS

[75] Inventor: Jacob G. Rabatin, Montville, Ohio

[73] Assignee: General Electric Company, Schenectady, N.Y.

[21] Appl. No.: 540,940

[22] Filed: Oct. 11, 1983

Related U.S. Application Data

[63] Continuation-in-part of Ser. No. 371,832, Apr. 26, 1982, abandoned.

[51] Int. Cl.$^3$ .............................................. G03C 1/76
[52] U.S. Cl. ................................... 430/496; 430/966; 430/967; 430/525
[58] Field of Search ............... 430/496, 525, 966, 967; 250/483.1, 460, 486; 252/301.4 H

[56] References Cited

U.S. PATENT DOCUMENTS 3,795,814  1/1978  Rabatin .......................... 250/483.1
4,070,583  3/1974  Rabatin .......................... 250/483.1

Primary Examiner—Won H. Louie
Attorney, Agent, or Firm—John F. McDevitt; Philip L. Schlamp; Fred Jacob

[57] ABSTRACT

Rare earth oxyhalide phosphors activated with thulium ion are employed in X-ray intensifying screens having modified ultraviolet emission characteristics which reduce crossover effects without significant reduction in film speed and further increases screen brightness. Relatively low concentration levels of the thulium activator ion have been found to shift the ultraviolet emission of said phosphor when excited by X-rays to lower wavelengths in both the ultraviolet and near-ultraviolet spectral regions.

4 Claims, 1 Drawing Figure

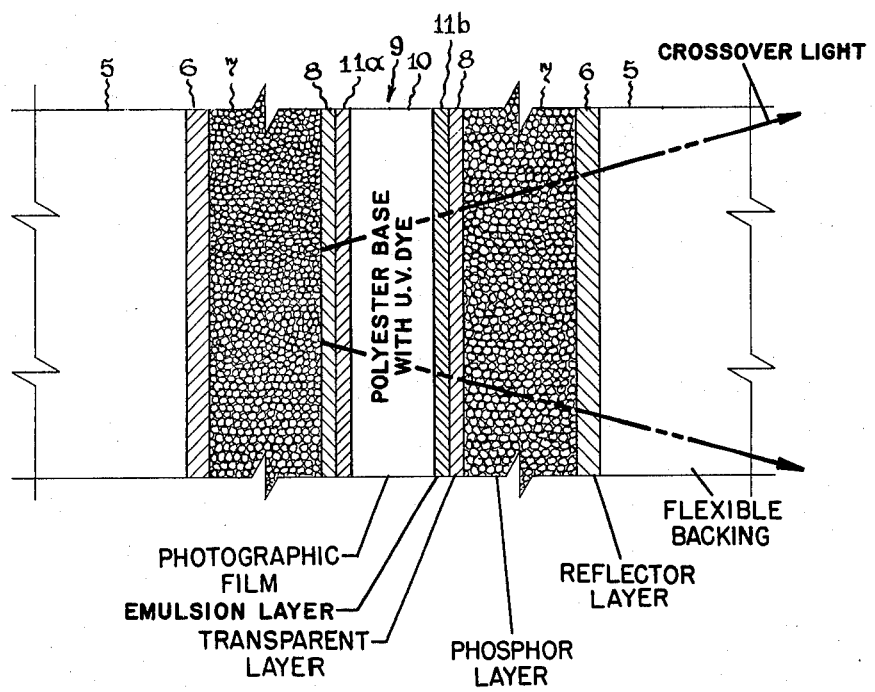

MULTI-LAYER X-RAY SCREENS

This is a continuation-in-part of application Ser. No 371,832, filed Apr. 26, 1982, abandoned.

BACKGROUND OF THE INVENTION

This invention relates generally to certain rare-earth oxyhalide phosphors activated with thulium for conversion of X-rays to visible light in multi-layer type X-ray screens exhibiting improved performance. More particularly, a specific concentration level for the thulium activator ion in said phosphors yields a better image in the associated photographic film without sacrificing either brightness or film speed.

In U.S. Pat. No. 3,795,814, assigned to the present assignee, there is disclosed certain lanthanum and gadolinium oxyhalide luminescent materials activated with thulium for use in X-ray image converter devices including X-ray screens. The thulium activator level in said phosphors is disclosed to be in the range from about 0.00025 to 0.01 moles per mole of the selected oxyhalide and is said to produce photographic images of improved brightness at a given level of X-ray exposure when employed in multi-layer type X-ray screens. Film speeds are also said to be improved with said phosphor material as compared with other phosphors in commercial use. There is further recognition of a more efficient conversion response by the phosphor attributable to its ultraviolet-blue emission characteristic. The optimum thulium activator concentration is said to reside between 0.002 and 0.003 moles thulium per mole of phosphor for the reported improvement in light production efficiency.

In more recently issued U.S. Pat. No. 4,070,583, also assigned to the present assignee, there is disclosed other thulium and terbium coactivated rare-earth oxyhalide phosphors also found useful in multi-layer type X-ray screens. Said phosphors are reported to exhibit increased ultraviolet emission when compared with the same rare-earth oxyhalide phosphor activated with terbium alone which is further recognized to help reduce undersirable light crossover between multiple emulsion layers in the associated photographic film. It is also further recognized in this same regard that incorporation of an ultraviolet-absorbing dye in the photographic film base can further reduce crossover by absorption of the ultraviolet radiation.

The present phosphors still further reduce crossover effects by shifting the ultraviolet emission produced when said phosphor is excited with X-rays. More particularly, certain rare-earth oxyhalide phosphors activated with thulium ion alone produce a higher proportion of lower wavelength radiation in the ultraviolet and near ultraviolet spectral region when the thulium ion concentration is maintained below a critical level in the previously discovered concentration range for said phosphor.

SUMMARY OF THE INVENTION

Briefly, an improved X-ray screen is provided comprising a double emulsion silver halide photographic film positioned between a pair of contiguous phosphor layers having a rare-earth oxyhalide phosphor with the general formula:

$LnOX:Tm^{+3}$ wherein
  Ln is one or more of La and Gd,
  X is one or more of Cl and Br,
  Tm is present as an activator at a concentration in the range from about 0.0005 to 0.001 moles per mole of the selected oxyhalide.

Said phosphor exhibits a modified ultraviolet emission which reduces crossover effects without significant reduction in film speed. The discovered emission shift to lower wavelengths in both the ultraviolet and near ultraviolet spectral regions at the given activator levels is of a specific nature wherein a limited bandwidth of the ultraviolet radiation is increased through reduction of near ultraviolet radiation in the adjacent bandwidth region. As a consequence, more radiation is produced in the particular ultraviolet spectral region (301 nanometers wavelength) where the conventional silver halide emulsion being used in the associated photographic film is most sensitive. Undesired crossover effects are thereby ameliorated since there will be less escape of the incident ultraviolet radiation. At the specified lower thulium concentrations, there should further be reduced interaction between adjacent activator ions which can lead to a more narrow scintillation energy distribution when the phosphor in the improved X-ray screen is exposed to X-rays for quantum noise reduction in the exposed photographic film.

A surprising feature of the present invention resides in a further discovery by the present applicant that improved X-ray brightness or visible light emission from the phosphor material does not occur outside the above specified activator levels. As will be apparent from the hereinafter provided specific examples of said phosphor material, both lesser or greater activator levels have been found to produce less visible emission which reduces sharpness of the recorded image. Accordingly, image sharpness is improved according to the present invention as a result of both increased light emission from the phosphor material and a shift in the ultraviolet emission which is also produced to wavelengths favoring sensitization of the associated photographic film. While it is known to increase X-ray brightness by increasing the thickness of the phosphor layer, it is also recognized that image sharpness will be reduced as a consequence.

In its preferred embodiments, the present improved X-ray screen utilizes a lanthanum oxybromide phosphor in operative relationship with emulsion layers in a photographic film which includes silver halide. The preferred screen construction further includes light reflection means in the form of reflector layers positioned contiguous to the exteriormost surface of each phosphor layer of a double emulsion photographic film.

BRIEF DESCRIPTION OF THE DRAWING

The above mentioned advantages of the present invention are more clearly understood when considered in conjunction with the accompanying drawing which represents an enlarged cross section of a typical X-ray screen including a phosphor material of the present invention.

DETAILED DESCRIPTION OF THE PREFERRED EMBODIMENTS

The accompanying FIGURE depicts an arrangement consisting of a double emulsion photographic film 9 which has a polyester base 10 incorporating a dye system to absorb ultraviolet and visible radiation which ordinarily crosses over from one of the silver halide emulsion layers to the other, 11a to 11b, and vice versa. Light crossover causes the widening of images and blurring due to a lack of alignment or registry between the image as formed on the principal emulsion layer and the emulsion layer which receives the crossover image. This is illustrated by crossover light rays passing from emulsion layer 11a to 11b. As will be appreciated, there is an enlarged image on the emulsion layer 11b which will be read as a blurring effect after the film is processed. In order to minimize the effects of crossover, it is desirable to have the phosphor emit primarily in the ultraviolet region rather than in the visible light region. This is due to the fact that the ultraviolet emission from a phosphor adjacent the emulsion layer undergoes absorption by the silver halide particles of the emulsion layer. Additionally, some ultraviolet radiation is absorbed by the polyester base 10. If an ultraviolet absorbing dye is further incorporated in said polyester 10, then even a greater portion of crossover ultraviolet radiation is absorbed rather than passing to the more distant emulsion layer. If a particular phosphor has a high visible light emission, however, it is difficult to reduce the crossover of this visible light between emulsion layers because any absorption materials also absorb the visible light necessary to read the film after processing. A suitable ultraviolet absorbing dye for incorporation into the photographic film base thereby desirably transmits visible light but absorbs ultraviolet radiation. As further depicted in said drawing, the illustrated X-ray screen is constructed of a flexible backing 5, a reflector layer 6, a phosphor layer 7, which includes the improved phosphor material of the present invention, and a transparent layer 8. It is to be appreciated that in the X-ray screen depicted there is a pair of contiguous phosphor layers positioned in a sandwich relationship with the double emulsion photographic film shown.

The following Table I reports relative brightness measurements obtained upon improved phosphors of the present invention along with the shift in emission behavior that occurs when said phosphors are excited by X-ray radiation. The comparative response of these improved phosphor layers was measured when exposed to X-rays at 70–100 KeV intensity using a one inch aluminum filter at a 30 inch distance.

TABLE 1

| Sample Number | Mole Fraction $Tm^{+3}$ | X-Ray Brightness | Ratio of Emissions 301 nm | 370 nm | 460 nm |
| --- | --- | --- | --- | --- | --- |
| 1 | .003 | 97% | 100% | 92% | 58% |
| 2 | .002 | 100% | 100% | 85% | 52% |
| 3 | .001 | 103% | 100% | 80% | 50% |

TABLE 1-continued

| Sample Number | Mole Fraction $Tm^{+3}$ | X-Ray Brightness | Ratio of Emissions 301 nm | 370 nm | 460 nm |
| --- | --- | --- | --- | --- | --- |
| 4 | .0005 | 103% | 100% | 76% | 44% |
| 5 | .0003 | 80% | — | — | — |

As can be observed from the above measurements, the visible light increase occurs selectively in the 0.0005–0.001 thulium activator range and which is accompanied by a shift in the ultraviolet emission characteristics. There is further evidenced by said measurements relatively more ultraviolet emission at 301 nanometers wavelength at the lower thulium ion concentrations reported. This shift is desirable since crossover is reduced as a result of having said emission absorbed by the silver halide emulsion.

It will be apparent from the foregoing description for said preferred embodiment that other improved X-ray screens employing the present phosphor materials with comparable benefit can also be constructed. For example, phosphor mixtures containing the improved phosphors are contemplated that utilize still other efficient rare-earth activated phosphors to provide a comparable improvement for various radiographic purposes. It is intended to limit the present invention, therefore, only by the scope of the following claims.

What I claim as new and desire to secure by U.S. Letters Patent is:

1. An improved X-ray screen comprising a double emulsion silver halide photographic film positioned between a pair of contiguous phosphor layers having a rare earth oxyhalide phosphor with the general formula:

$$LnOX:Tm^{+3}$$

wherein
Ln is one or more of La and Gd,
X is one or more of Cl and Br,
Tm is present as sole activator at a concentration in the range from 0.0005 to 0.001 moles per mole of the selected oxyhalide, said phosphor exhibiting modified ultraviolet emission to reduce crossover effects without significant reduction in film speed and further providing more ultraviolet emission at 301 nanometers wavelength accompanied by increased screen brightness.

2. An X-ray screen as in claim 1 wherein said phosphor is lanthanum oxybromide.

3. An X-ray screen as in claim 1 wherein the film includes a base which transmits visible light but absorbs ultraviolet radiation.

4. An X-ray screen as in claim 1 which further includes light reflection means.

* * * * *